United States Patent [19]

Snow

[11] Patent Number: 4,947,096
[45] Date of Patent: Aug. 7, 1990

[54] METHOD AND APPARATUS FOR CONTROLLING MULTIPLE ENGINE AIRCRAFT

[75] Inventor: Barton H. Snow, Wyoming, Ohio

[73] Assignee: General Electric Company, Cincinnati, Ohio

[21] Appl. No.: 240,020

[22] Filed: Sep. 2, 1988

Related U.S. Application Data

[62] Division of Ser. No. 715,569, Mar. 25, 1985, Pat. No. 4,787,201.

[51] Int. Cl.$^5$ .............................................. B64C 13/16
[52] U.S. Cl. .................................... 318/586; 244/76 J
[58] Field of Search .............. 318/584, 586; 60/228, 60/229; 244/12.3, 12.4, 23 D, 51, 52, 56, 76 J, 87, 172

[56] References Cited

U.S. PATENT DOCUMENTS

| | | | |
|---|---|---|---|
| 2,597,020 | 5/1952 | Nissen | 244/76 |
| 2,670,157 | 2/1954 | Peterson | 244/76 J |
| 2,737,015 | 3/1956 | Wright | 60/35.6 |
| 2,759,689 | 8/1956 | Owen | 244/76 J |
| 2,943,822 | 7/1960 | Hamilton | 244/76 J |
| 2,974,594 | 3/1961 | Boehm | 244/76 J |
| 3,070,330 | 12/1962 | Escher | 244/76 J |
| 3,120,359 | 2/1964 | Sprecher | 244/12 |
| 3,218,800 | 11/1965 | Ensinger | 60/35.6 |
| 3,231,223 | 1/1966 | Upper | 244/52 |
| 3,286,143 | 11/1966 | Kurtz et al. | 244/76 J |
| 3,304,721 | 2/1967 | Oppel | 60/232 |
| 3,311,130 | 3/1967 | Caldwell | 137/608 |
| 3,515,361 | 6/1970 | Blackburn | 244/52 |
| 3,750,985 | 8/1973 | Wheldon | 318/586 |
| 4,017,045 | 4/1977 | Kirchhein | 244/194 |
| 4,038,526 | 7/1977 | Eccles et al. | 235/150.1 |

Primary Examiner—Bentsu Ro
Attorney, Agent, or Firm—Jerome C. Squillaro

[57] ABSTRACT

Control means and method for steering an aircraft is disclosed. The aircraft includes engines positioned on opposite sides of its longitudinal axis. The method comprises: selecting an aircraft heading; sensing a deviation from said heading; and varying the thrust of at least one engine in response to the sensed deviation.

10 Claims, 2 Drawing Sheets

METHOD AND APPARATUS FOR CONTROLLING MULTIPLE ENGINE AIRCRAFT

This is a division of application Ser. No. 715,569, now U.S. Pat. No. 4,787,201, filed 3-25-85.

This invention relates to a method and means for improving the effiency of multiple engine aircraft by the use of differential thrust output between engines.

BACKGROUND OF THE INVENTION

Aircraft with two or more engines positioned on opposite sides of the longitudinal axis of the aircraft have a tendency to turn if the torque generated by such engines is unequal. In practice, a mismatch in torque is unavoidable. Primarily this is due to the fact that at equal power settings similar engines will differ in power by 1–3% . In addition, oppositely positioned engines frequently are slightly misaligned resulting in turning moments on the aircraft.

During flight, a pilot will set equal power for both engines and position the aircraft to fly a predetermined course. Flight control will maintain this course and overcome the unequal torque of the engines by use of a continous rudder correction. However, such rudder correction results in a degradation of flight efficiency by creating a drag on the aircraft.

OBJECTS OF THE INVENTION

It is an object of the present invention to provide a new and improved method and means for improving the flight efficiency of a multiple engine aircraft.

It is another object of the present invention to match the thrust output of oppositely positioned engines on a multiple engine aircraft.

It is a further object of the present invention to provide a new and improved method and means for minimizing rudder angle drag in a multiple engine aircraft.

It is yet another object of the present invention to provide a new and improved method and means of steering an aircraft without the use of a rudder.

SUMMARY OF THE INVENTION

The present invention applies to an aircraft including two engines positioned on opposite sides of the longitudinal axis of the aircraft. One form of the present invention is a method for steering the aircraft comprising the steps of: selecting an aircraft heading; sensing a deviation from that heading; and varying the thrust of at least one engine in response to the sensed deviation.

Another form of the present invention, in which the aircraft includes a rudder for steering control, is a method for improving flight efficiency. The method comprises the steps of: setting a rudder angle in pursuit of a preselected heading; sensing the rudder angle; and varying the thrust of at least one engine in response to rudder angle to reduce the angle and maintain the preselected heading.

DETAILED DESCRIPTION OF THE INVENTION

Figure 1:
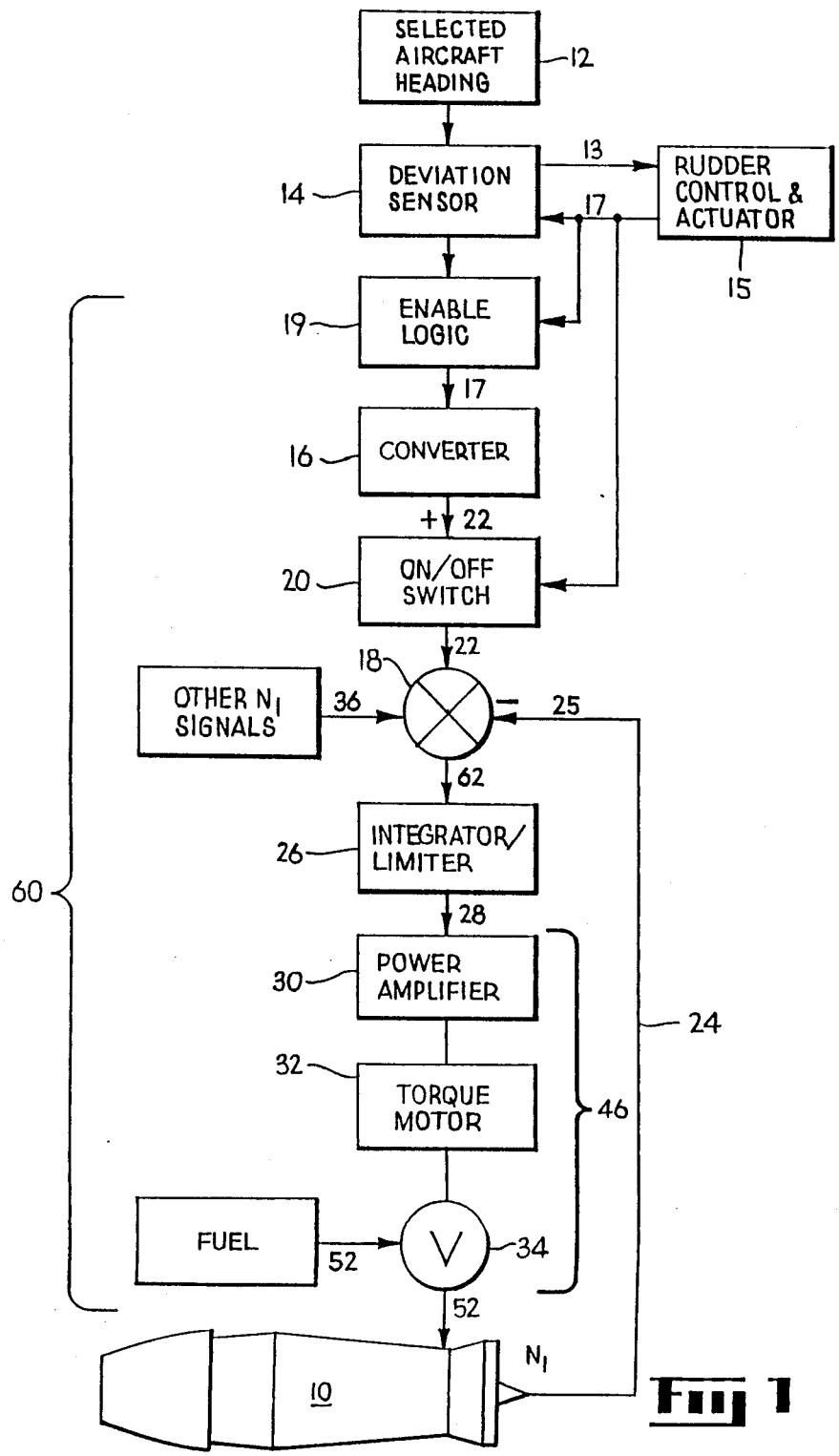
FIG. 1 is a block diagram showing one form of the present invention.

FIG. 1 shows a control diagram for an engine 10 positioned on one side of the longitudinal axis of an aircraft. The diagram shows control means for varying the thrust of engine 10 in response to sensed deviations from a preselected aircraft heading. Such control means comprises means for selecting an aircraft heading shown in block 12. Such means may include an autopilot and a control for setting equal power in oppositely positioned engines and monitoring selected coordinates. The selection of an aircraft heading will typically change many times during the course of a flight. However, for any given heading the presently described means for steering the aircraft will apply.

The control means further includes means for sensing a deviation from the heading by sensing means or deviation sensor 14. There are various means by which deviations from the heading may be sensed. In the simplest form, the deviation is the difference between actual and desired heading, and is available from the flight control. According to a more particular form of the invention, shown in FIG. 1, the aircraft includes a rudder for steering control. Normally, the deviation sensor 14 provides a signal 13 to the rudder control and actuator 15 to set a commanded course correction. A feedback rudder angle signal 17 as measured from the centerline of the aircraft is transmitted to deviation sensor 14. When the deviation in headings is small or zero, the aircraft is flying on the desired course. However, a sustained rudder signal 17 under this condition is undesirable and is corrected as will be described.

The control means further includes means 60 for varying the thrust of engine 10 in response to the deviation sensed by sensor 14. Thrust is varied by analog or digital control of the fuel flow to engine 10. For ease of understanding, an analog system is shown in FIG. 1. However, it will occur to those skilled in the art that a digital system equivalent to that described may be employed. Means 60 include a converter 16, an integrator/limiter 26, valve control means 46, and feedback means 24. The function and operation of which will become clear from the following.

When the deviation in heading is small or zero, the enable logic 19 closes a switch which allows sustained rudder signal 17 to be transmitted to a converter 16. Converter 16 scales the signal 17 to a desired engine thrust change and generates an error signal 22 as input to on/off switch 20 and thence to summation means or adder 18. Feedback means 24 are provided for modifying error signal 22 in response to a fan speed signal 25. A modified error signal 62 is generated by adder 18 as input to integrator/limiter 26. When the aircraft course heading is correct and the rudder angle is zero, both the rudder position signal 17 and the output error signal 62 of adder 18 will be zero. The on/off switch 20 is provided in the control and governs when the engine steering control will be operative. For example, there may be times during flight when it is not desired to have automatic control for varying engine thrust. In such case, switch 20 will be off. It will be clear that switch 20 may be positioned at other locations in the control. Switch 20 also includes a means of setting error signal 22 to zero when in the off position.

The error signal 62 will be entered into integrator/limiter 26. Integator/limiter 26 sums over time the error signal 62 received from adder 18 and generates an output in the form of an engine speed signal 28 in response thereto. The signal 28 will be restricted within predetermined limits to prevent an excessively large signal 28 from being generated. Signal 28 may be entered directly into valve control means 46 for controlling fuel flow 52 in response to speed signal 28. Valve control means 46 includes a power amplifier 30 for driving an electrohydraulic servo valve or torque motor 32 and fuel control valve 34. According to an alternative form of the invention, signal 22 may summed with other fan speed ($N_1$) control signals 36. In this manner, a single power amplifier 30, motor 32, and valve 34 may be used by several control functions for each engine 10.

To control fan speed $N_1$, negative feedback of such speed will be entered into summer 18. In this manner, fan speed $N_1$ will approach the sum of other $N_1$ signals 36 and error signal 22. The present invention contemplates monitoring fan speed $N_1$ as an indicator of engine trust. Other engine parameters, such as engine or fan pressure ratio, may similarly be monitored and are within the scope of the present invention.

According to one form of the present invention, an aircraft may be steered by the control means disclosed. This would apply to aircraft with no means of steering other than by differential engine thrust as well as aircraft with movable control services such as a rudder but where such control surfaces are locked in a fixed position. In operation, deviation sensor 14 will continuously monitor heading errors which will be converted, as described above, to a signal for varying the thrust of engine 10 in response to the sensed deviation.

The invention applies equally to an aircraft with movable control surface such as a rudder for steering control. In such case, rudder position will be continuously monitored to minimize its angle while maintaining a predetermined heading. Rudder angle is measured from the longitudinal centerline of the aircraft so that an angle of zero corresponds to an alignment of the rudder with such centerline. Deviations from a zero angle result in aircraft drag.

In operation, the control is designed to improve flight efficiency. The method comprises the steps of setting a rudder angle in pursuit of a preselected heading, sensing the rudder angle, and varying the thrust of at least one engine in response to rudder angle to reduce the angle and maintain the preselected heading. The rudder angle may be sensed and the thrust varied continuously so as to minimize the angle.

The method may further comprise the step of selecting a thrust for each engine prior to or after selecting an aircraft heading. In normal operation, the pilot will set each engine for equal thrust. However, slight variations in thrust between the several engines as well as slight misalignments of the engines will create a turning moment about the longitudinal axis of the aircraft. Typically, the pilot will preselect a heading and the flight control will automatically set rudder angle in pursuit of that preselected heading. The rudder angle will create a drag on the aircraft which reduces flight efficiency. By sensing the rudder angle and varying the thrust of at least one engine in response to rudder angle, the angle, and consequently drag, will be reduced.

Figure 2:
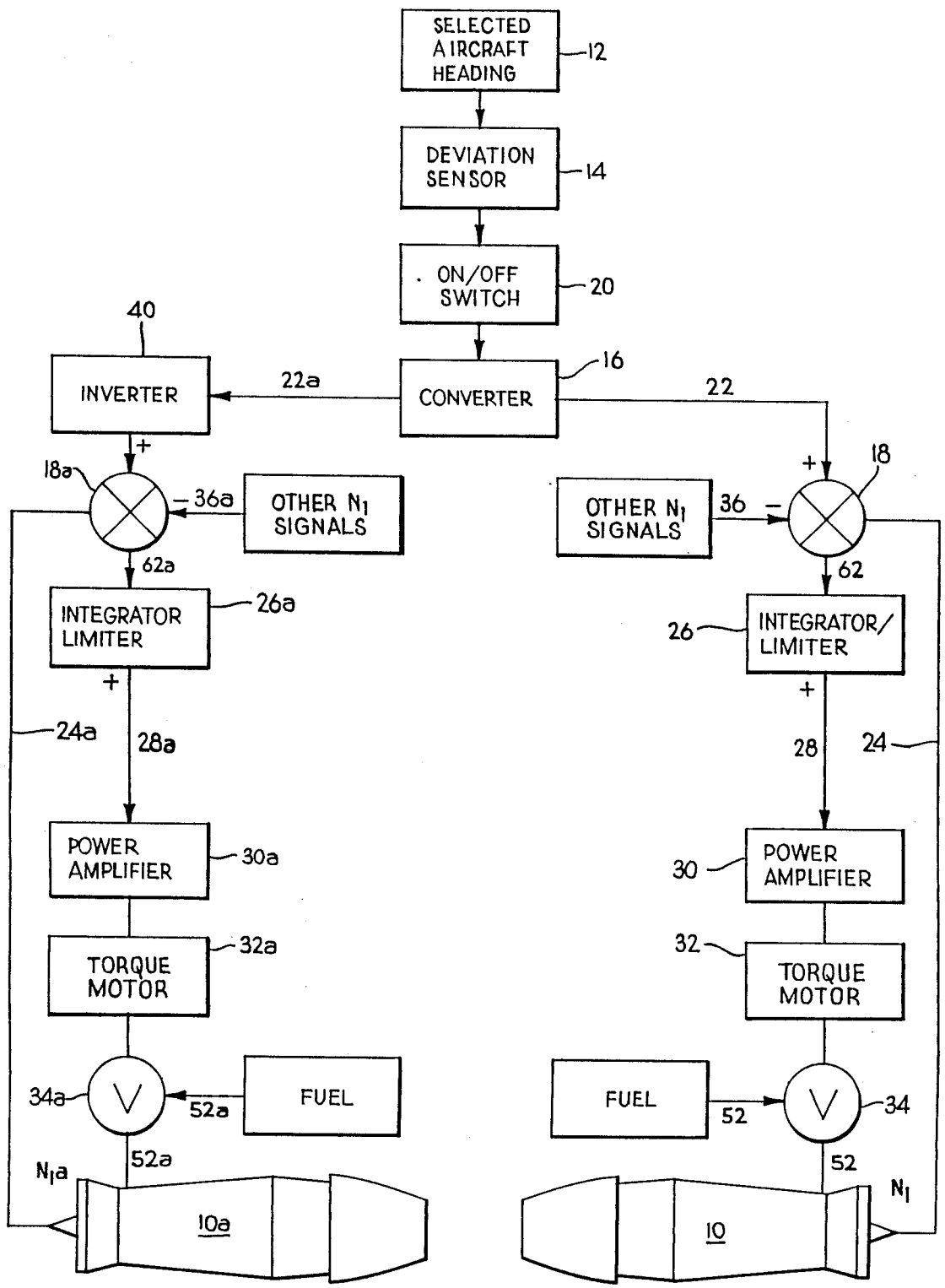
FIG. 2 is a block diagram showing an alternative form of the present invention.

FIG. 2 shows an alternative form of the present invention wherein the thrust of two engines positioned on opposite sides of the longitudinal axis of an aircraft are simultaneously controlled. Each engine 10 and 10a will be controlled in a manner similar to that shown in FIG. 1. However, an inverter 40 will be inserted in the control for engine 10a to change the sign of signal 22a coming from converter 16. In this manner, engine 10a will be reduced in power while engine 10 is being increased in power or vice versa as required by the signal received from deviation sensor 14.

It will be clear to those skilled in the art that the present invention is not limited to the specific embodiments described and illustrated herein. Nor, is it limited to any particular network for controlling engine thrust. Rather, it applies equally to any automatic control system which is capable of sensing a deviation from a preselected heading and varying the thrust of at least one engine in response to the sensed deviation.

Numerous modifications, variations, and full and partial equivalents can now be undertaken without departing from the invention as limited only by the spirit and scope of the appended claims.

What is desired to be secured by Letters Patent of the United States is the following.

I claim:

1. In an aircraft including two engines positioned on opposite sides of the longitudinal axis of said aircraft, and a rudder for steering control, apparatus for improving flight efficiency, comprising:
   means for setting a rudder angle in pursuit of a preselected heading;
   means for sensing said rudder angle; and
   means for varying the thrust of at least one engine in response to said rudder angle to reduce said rudder angle and maintain said preselected heading.

2. Apparatus according to claim 1, wherein said means for setting a rudder angle comprises:
   means for selecting said preselected aircraft heading; and
   means for sensing a deviation of the actual aircraft heading from said preselected heading and setting said rudder angle.

3. Apparatus according to claim 2, wherein said means for varying the thrust of at least one engine comprises:
   a converter for generating an error signal from said sensed rudder angle;
   an integrator/limiter for summing the error signal and then generation an engine speed signal within predetermined limits; and
   valve control means for controlling fuel flow in response to said engine speed signal.

4. Apparatus according to claim 3, wherein said means for varying the thrust of at least one engine further comprises feedback means for modifying said error signal in response to the output of said valve control means.

5. Apparatus according to claim 4, wherein said valve control means comprises:
   a power amplifier
   a torque motor; and
   a fuel control valve mechanically coupled to said torque motor;
   whereby said power amplifier is responsive to said engine speed signal to drive said torque motor and said fuel control valve.

6. In an aircraft including a first engine positioned on one side of the longitudinal axis of said aircraft and a second engine positioned on the opposite side of the longitudinal axis of said aircraft, control means for steering said aircraft comprising:
   means for selecting an aircraft heading;

means for sensing a deviation of the actual aircraft heading from said selected heading;
a converter for generating an error signal from said sensed deviation;
a first integrator/limiter for summing the error signal and then generating a first engine speed signal within predetermined limits;
first valve control means for controlling fuel flow in said first engine in response to said first engine speed signal;
means for generating an inverted signal from said error signal;
a second integrator/limiter for summing the inverted signal and then generating a second engine speed signal within predetermined limits; and
second valve control means for controlling fuel flow in said second engine in response to said second engine speed signal.

7. In an aircraft including a first engine positioned on one side of the longitudinal axis of said aircraft, a second engine positioned on the opposite side of the longitudinal axis of said aircraft, and a rudder for steering control, apparatus for improving flight efficiency, comprising:
means for setting a rudder angle in pursuit of a preselected heading;
means for sensing said rudder angle;
a converter for generating an error signal from said sensed rudder angle;
a first integrator/limiter for summing the error signal and then generating a first engine speed signal within predetermined limits;
first valve control means for controlling fuel flow in said first engine in response to said first engine speed signal;
means for generating an inverted signal from said error signal;
a second integrator/limiter for summing the inverted signal and then generating a second engine speed signal within predetermined limits; and
second valve control means for controlling fuel flow in said second engine in response to said second engine speed signal.

8. In an aircraft including two engines positioned on opposite sides of the longitudinal axis of said aircraft, control means for steering said aircraft comprising
means for selecting an aircraft heading;
means for sensing a deviation from said heading;
a converter for generating an error signal from said sensed deviation;
an integrator/limiter for summing the error signal and then generating an engine speed signal within predetermined limits; and
valve control means for controlling fuel flow to at least one engine in response to said speed signal to vary the thrust of said last-recited engine.

9. The control means as recited in claim 8, and further comprising feedback means for modifying said error signal in response to the output of said valve control means.

10. The control means as recited in claim 9, wherein said valve control means comprises:
a power amplifier
a torque motor; and
a fuel control valve mechanically coupled to said torque motor;
wherein said power amplifier is responsive to said speed signal to drive said torque motor and said fuel control valve.

* * * * *